UNITED STATES PATENT OFFICE.

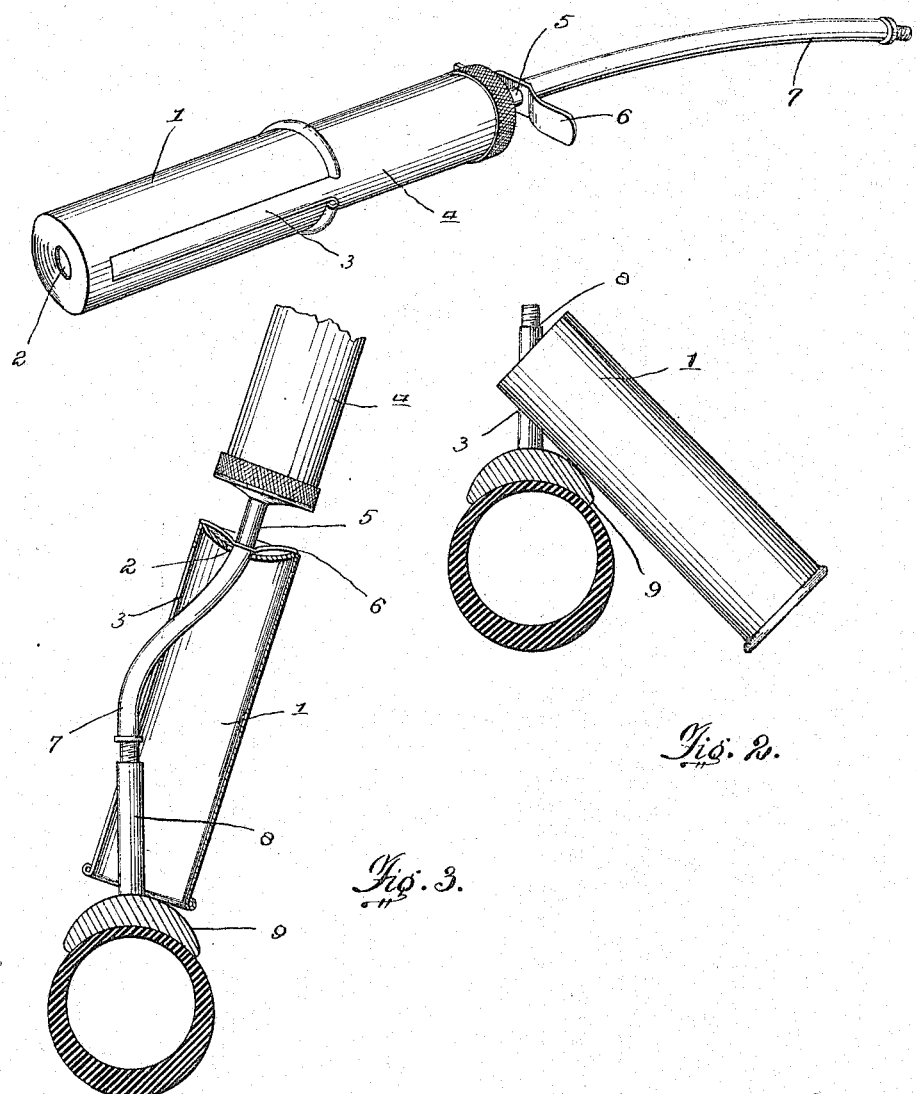

GURNEY E. BOYD, OF LOS ANGELES, CALIFORNIA.

BICYCLE PUMP-SUPPORT.

1,122,064.

Specification of Letters Patent. Patented Dec. 22, 1914.

Application filed August 15, 1913. Serial No. 784,991.

*To all whom it may concern:*

Be it known that I, GURNEY E. BOYD, a citizen of the United States, residing at Los Angeles, in the county of Los Angeles and State of California, have invented new and useful Improvements in Bicycle Pump-Supports, of which the following is a specification.

The chief intent of the present invention is the provision of means for sustaining the ordinary hand pump such as generally used for inflating pneumatic tires of bicycles and analogous machines provided with pneumatic tires.

The invention provides a support which when not required for immediate use may be arranged to occupy but very little room so as not to be in the way and which when in use forms a substantial support for the usual hand pump so that the latter may be conveniently and effectively operated.

The invention provides a hollow support which may be slipped upon the barrel of the pump when not required for use so as to occupy little or no additional space, said hollow support being constructed to engage the rim of the wheel and to inclose the air valve and rubber connection between the hand pump and tire while the end of the pump obtains a purchase upon the outer end of the support, the latter sustaining the thrust when the pump is operated to force air into the tire.

The invention consists of the novel features, details of construction and combination of parts, which hereinafter will be more particularly set forth, illustrated in the accompanying drawing, and pointed out in the appended claim.

Referring to the drawing, forming a part of the specification, Figure 1 is a perspective view, showing the support slipped upon the barrel of a hand pump such as generally employed for inflating pneumatic tires. Fig. 2 is a detail view, showing the support in position with the end of the air valve passing through the same to receive the rubber connection of the hand pump. Fig. 3 is a view showing the position of the support when in active operation to sustain the thrust when operating the pump to force air into the tire.

Corresponding and like parts are referred to in the following description, and indicated in all the views of the drawing, by the same reference characters.

The support 1 consists of a hollow body which is closed at one end and is open at the opposite end, the closed end having a central opening 2 for the passage of the end of the air valve when placing the support in position as indicated in Fig. 2 and to receive the rubber connection when the support is in active operation, as indicated in Fig. 3. A longitudinal slot 3 is formed in a side of the support and extends through the open end. The closed end of the support is made concave to receive the end of the rest at the outer end of the piston rod of the hand pump. The support is preferably of cylindrical form and consists of a length of tube about five to six inches in length more or less and of a diameter to slip upon the barrel of the hand pump. The opening 2 and the width of the slot 3 are such as to admit of the end of the air valve passing therethrough as well as the rubber connection of the hand pump.

The hand pump illustrated is of ordinary construction such as generally provided for inflating pneumatic tires of bicycles and like machines or vehicles. As indicated the pump comprises a barrel 4 in which is arranged to operate a piston, the stem 5 of which projects through an end of the barrel and is provided with a rest or hand grip 6. A rubber connection 7 is coupled to the outer end of the stem or rod 5 of the piston and is adapted to make connection with the air valve 8 of the tire to be inflated. The rubber connection 7 consists of a flexible tube approximately five inches long.

When the support is not required for immediate use it is slipped upon the barrel of the pump so as to be out of the way and occupy little or no room. When it is required to inflate the tire the support 1 is withdrawn from the barrel of the pump and is placed in position upon the rim 9 of the wheel with the end of the air valve 8 passing through the slot 3 and opening 2, after which the end of the rubber connection 7 is coupled to the projecting end of the air valve. The support is now moved to bring its open end in engagement with the rim 9 of the wheel and such movement causes a rubber connection 7 to pass within the support. When the parts are in position the end of the rest 6 is brought against the concave end of the support 1 and such rest and support are grasped by one hand and retained in place while the other hand grasps the barrel of the pump and reciprocates the same in the well known manner. The pressure exerted to force the air from the pump into the tire is sustained by the support 1 and transferred by such support to the rim of the wheel, thereby enabling the pump to be operated without the experience of fatigue and inconvenience resulting from the use of the hand pump where the pressure is to be sustained solely by the hand.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

In combination with a hand pump for inflating pneumatic tires, such hand pump comprising a barrel and a piston having a stem which projects beyond the barrel and is provided at its outer end with a rest, a hollow body adapted in one position to slip upon the barrel of the pump and fit the same snugly, such body having a longitudinal slot extending along one side from the open end of the body to within a short distance of the opposite end of such body, which end is closed and formed with an opening in the closed end, said body in operative position having its closed end engaging the rest of the stem of the piston of the pump with the pump connection passing through the opening of such closed end, the longitudinal slot in the side of the body receiving the pump connection and stem of the air valve.

In testimony whereof I affix my signature in presence of two witnesses.

GURNEY E. BOYD.

Witnesses:
GROVER H. WALKER,
MAE C. WALKER.

Copies of this patent may be obtained for five cents each, by addressing the "Commissioner of Patents, Washington, D. C."